United States Patent [19]

Chikusa

[11] Patent Number: 5,184,256
[45] Date of Patent: Feb. 2, 1993

[54] WRITE-DATA SIGNAL COMPENSATION APPARATUS FOR DISK STORAGE

[75] Inventor: Eiji Chikusa, Kawasaki, Japan

[73] Assignee: Fuji Electric Co., Ltd., Kawasaki, Japan

[21] Appl. No.: 540,925

[22] Filed: Jun. 8, 1990

[30] Foreign Application Priority Data

Jun. 16, 1989 [JP] Japan ................................ 1-153681

[51] Int. Cl.$^5$ .............................................. G11B 5/09
[52] U.S. Cl. ........................................ 360/65; 360/45
[58] Field of Search ........................ 360/31, 46, 65, 45

[56] References Cited

U.S. PATENT DOCUMENTS

| | | | |
|---|---|---|---|
| 2,901,734 | 8/1959 | Stovall, Jr. ............................ | 360/65 |
| 3,430,215 | 2/1969 | Krossa et al. ......................... | 360/65 |
| 4,607,295 | 8/1986 | Uno ....................................... | 360/45 |
| 4,809,088 | 2/1989 | Lofgren et al. ....................... | 360/31 |
| 4,916,556 | 4/1990 | Sander et al. ......................... | 360/45 |
| 5,025,327 | 6/1991 | Stanness et al. ...................... | 360/45 |

Primary Examiner—David J. Severin
Attorney, Agent, or Firm—Spencer, Frank & Schneider

[57] ABSTRACT

A write-data signal compensastion apparatus for disk storage including a number of write signal compensation circuits having different compensation amounts. Write signal compensation is achieved by the disk storage itself using one of the compensation circuit. A compensation amount selecting device is provided for designating whether write signal compensation should be performed or not, and in the case of compensation, the selecting device generates a selection signal designating the compensastion amount in response to the radial position of the data write head on a disk. A compensation amount switching circuit, receives the selection signal from the compensation amount selecting device and transmits the write signal to the disk storage. When the compensation amount designated by the selection signal is zero, the original write signal is transmitted without change; otherwise, the original signal is compensated by the amount designated by the compensation amount selecting device.

10 Claims, 2 Drawing Sheets

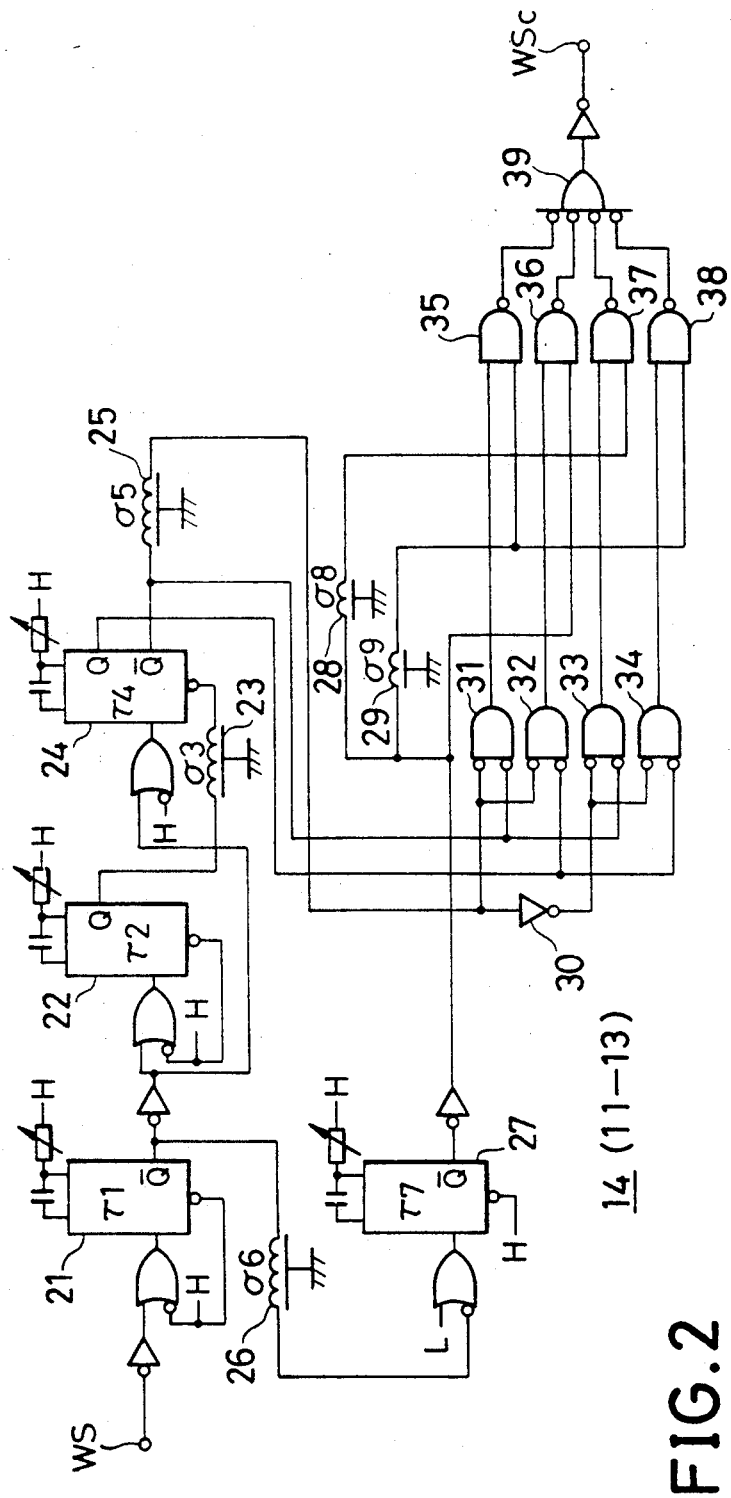
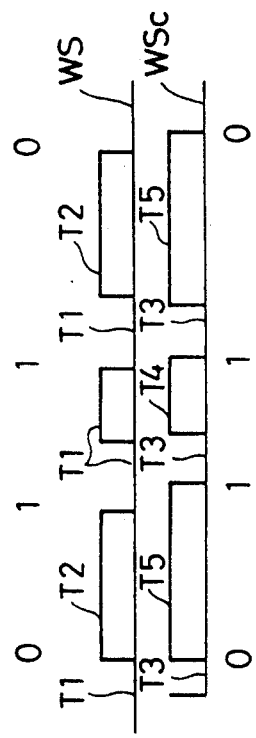
FIG.2
FIG.3A
FIG.3B

WRITE-DATA SIGNAL COMPENSATION APPARATUS FOR DISK STORAGE

BACKGROUND OF THE INVENTION

1. Field of the Invention

The present invention relates to a write-data signal compensation apparatus for disk storage used in a fixed disk apparatus or the like, and in particular, to a compensation apparatus for modifying a first write signal having a particular modulation data pattern into a second write signal having a data pattern expedient to be read out from a disk before the second write signal is written to the disk.

2. Description of the Prior Art

In disk storage, data are written in a number of tracks on a disk in a particular modulation pattern. These patterns are similar to digital data in that they are composed of an alternate pattern of N and S poles, i.e., "0" and "1". However, the patterns differ from the plain digital data in that they are recorded in a pattern modulated by a modulation technique such as MFM (Modified Frequency Modulation) or RLL (Run-Length Limited code) system. As a result, transitions from "0" to "1" or "1" to "0" in the pattern, and the length therebetween have a significant meaning. These patterns, when read out, give a differential waveform of the original pattern. This means that the read out waveform has maximal and minimal peaks at the transitions from "0" to "1" or "1" to "0", and hence, the original pattern can be reproduced by detecting these peaks, and thus, the write data can be decoded.

The transitions from "1" to "0" or vice versa in the read signal have definite intervals when the peak points are correctly detected: in one example of the MFM system, two intervals of 200 ns and 300 ns appear in the read signal, and this makes it possible to decode the original data.

In practical disk storage, however, the circumferential velocity of inner tracks on a disk is slower than that of outer tracks. Consequently, the level of the read signal from the inner tracks is significantly lower than the level from the outer tracks. In addition, the record density of the data pattern is higher in the inner tracks than in the outer tracks. This will cause a difference in the waveforms of the read signal from the inner tracks and the outer tracks. To align the level of the read signals from the inner and outer tracks, an AGC (Automatic Gain Control) amplifier is used. However, this tends to cause a "peak shift" which means that the peak positions detected are displaced from the correct positions. This is because the waveform difference between the read signals from the inner tracks and the outer tracks is enlarged by the frequency characteristics of the amplifier because patterns of different periods are mixed together in the read signals. Thus, the correct reproduction of the original data patterns becomes difficult, and the occurrence of read errors tend to increase.

The write signal compensation which is the object of the present invention is provided to correct the peak shift. Although the occurrence mechanism of the peak shift is significantly complicated, it has a certain inclination in accordance with data patterns. Consequently, the data pattern to be written on a disk can be compensated by shifting parts of the data pattern corresponding to the positions of peak shift in the read signal in advance by the amount inferred from the read signals in the direction reverse to that of the peak shift.

Conventionally, such a compensation of the write signal is achieved by a controlling portion incorporated or combined with disk storage. As is known, the controller includes a processor and a signal processing circuit, and is connected to a host CPU through buses and interfaces.

Locations on a disk to which data are written are designated from the host CPU to the controller in the form of logical addresses in the memory space of the disk storage. The processor in the controller then converts the logical addresses to physical addresses and instructs them to the disk storage.

The data to be written to the disk are also transferred from the CPU to the controller. The data processing circuit in the controller converts the data into the write signal according to a predetermined modulation scheme, and transfers it to the disk storage.

The controller is originally provided with a function for converting the write data into the write signal, and so the compensated write signal can be easily produced by slightly modifying the converting function. Furthermore, the controller is also provided with a function to calculate the track number, and hence, the compensation for the write signal can be easily performed corresponding to the write addresses of the data.

Producing the compensated write signal instead of an ordinary write signal in the controller makes it possible for the disk storage to simply receive the signal and write it on the disk. Thus, when the compensation is performed appropriately, the original data pattern can be reproduced with high fidelity and read errors of the data can be prevented, even if the peak shift errors occur during the peak detection of the read signal.

As described above, the conventional controller can rather easily compensate the write signal. However, increasing peak shifts will occur with the increase in the memory capacity of recent disk storage. This makes it difficult for the controller to compensate the write signal with high accuracy.

The waveform of the read signal of a data pattern is greatly affected by the following features of the disk storage: the type of a memory medium of a disk, the frequency characteristics of the AGC circuit for the read signal, the construction of the peak detection circuit, as well as the pattern recording density. However, the controllers are generally arranged to fit better to the CPU than to the disk storage in order to meet the requirement of the CPU. In addition, the controllers are designed so that they can be combined with any ordinary disk storage. Thus, it is difficult to precisely compensate the write signal to fit to any special features of the disk storage.

Theoretically, it is possible for the controller incorporated in disk storage to meet any special features of the disk. However, it becomes increasingly difficult to accomplish the precise compensation required by the recent high density recording of the data pattern: the controller, which is generally restricted in its capability and performance, can hardly achieve the precise compensation by switching compensation amounts in accordance with the radial position of a head.

Furthermore, many controllers are not provided with the write data compensation function at all. In such a case, improvement in reliability of the read operation of the disk storage, and thereby increasing the memory capacity must be given up.

SUMMARY OF THE INVENTION

It is therefore an object of the present invention to provide a write-data signal compensation apparatus for disk storage that can improve the accuracy of the compensation so as to meet the requirements resulting from the increasing recording density of the data pattern by substantially incorporating the write data compensation function into the disk storage.

To accomplish the object of the present invention, there is provided a write-data signal compensation apparatus for disk storage, which modifies a first write signal having a particular modulation data pattern into a second write signal having a data pattern expedient to be read out from a disk, before the second write signal is written to the disk by a write head, the write-data signal compensation apparatus comprising:

write signal compensation means for converting the first signal into the second signal by using a plurality of different compensation amounts;

compensation amount selecting means for generating a selection signal designating one of the plurality of different compensation amounts according to the radial position of the write head on the disk; and compensation amount switching means for switching inputs or outputs of the write signal compensation means in response to the selection signal transferred from the compensation amount selecting means so that the first signal is compensated by the compensation amount designated by the selection signal.

It is advantageous to construct the compensation amount selecting means so that the compensation amount for the outer tracks on the disk becomes zero, because the outer tracks require little compensation of the write data.

According to the present invention, a number of write signal compensation circuits having different compensation amounts are incorporated into disk storage so that the write signal compensation can be achieved by the disk storage itself using one of the compensation amounts, that is, one of the compensation circuits when the write signal compensation is necessary. Such a compensation may also be achieved by using one write signal compensation circuit and by designating the required compensation amount to the circuit. However, because this compensation operation cannot sufficiently achieve the required accuracy for the present, it is better to provide a compensation circuit separately for each compensation amount.

The present invention is provided with the compensation amount selecting means for designating whether the write signal compensation should be performed or not, and in the case of compensation, for designating the compensation amount. The selecting means generates a selection signal designating the compensation amount in response to the radial position of the data write head on a disk. Although the selecting means can be provided in the control side, it is preferably that the selecting means be incorporated into the disk storage itself so as to carry out a compensation most suitable for each special make of disk storage.

The compensation amount switching means, receiving the selection signal from the compensation amount selecting means, transmits the write signal to the disk storage: when the compensation amount designated by the selection signal is zero, the original write signal is transmitted without change; otherwise, the original signal is compensated by the amount designated by the compensation amount selecting means. In short, the compensation amount switching means compensates the write signal by the designated compensation amount. In practice, the compensation can be accomplished by switching a plurality of write signal compensation circuits, or by selecting one of the plurality of compensated write signals produced from these compensation circuits.

Thus, the present invention is provided with a plurality of write signal compensation means, and selects one of the compensation amounts for the write signal by the compensation amount switching means in response to the selection signal from the compensation amount selecting means. As a result, the present invention can accurately adjust the compensation amount in response to the radial position of the head on a disk so that the precise and elaborate compensation most suitable to the characteristics and special features of the disk storage can be achieved. Consequently, the present invention can prevent the read error even when the recording density is high, thus significantly improving the reliability of the disk storage.

BRIEF DESCRIPTION OF THE DRAWINGS

FIG. 2 is a circuit diagram showing an embodiment of the arrangement of the write signal compensation apparatus; and FIGS. 3A and 3B are waveform charts illustrating the waveforms concerning the write signal compensation performed by the compensation apparatus shown in FIG. 2.

DESCRIPTION OF THE PREFERRED EMBODIMENTS

Figure 1:
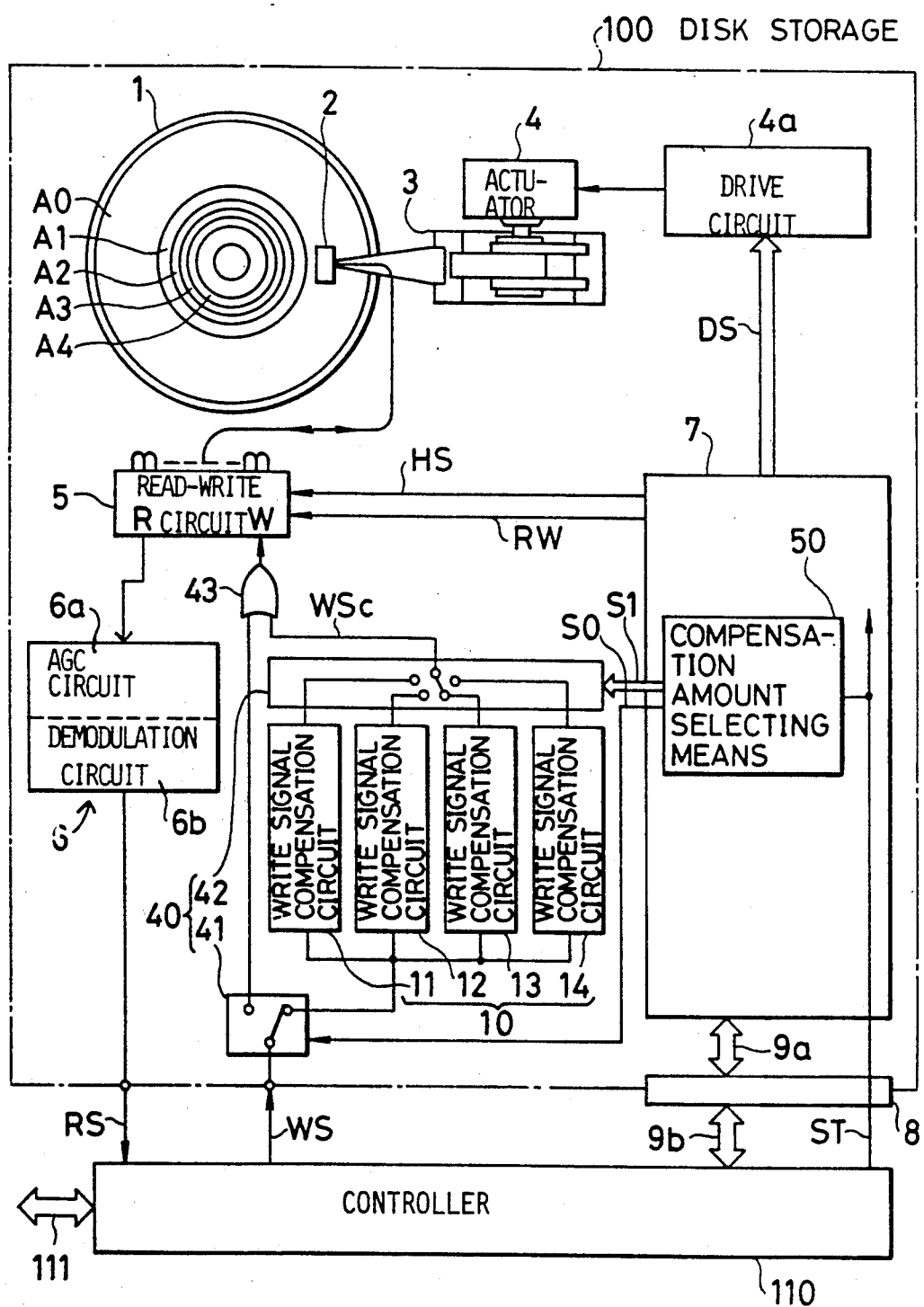
FIG. 1 is a block diagram showing an embodiment of an arrangement of disk storage incorporating a write-data signal compensation apparatus according to the present invention in conjunction with an accompanying controller.

The invention will now be described with reference to the accompanying drawings.

FIG. 1 is a block diagram showing an embodiment of an arrangement of disk storage (fixed disk storage) incorporating a write-data signal compensation apparatus according to the present invention in conjunction with an accompanying controller.

In FIG. 1, a mechanical portion of the disk storage 100 including a disk 1 is schematically illustrated at the top of a block enclosed by dash-dotted lines. Each surface of the disk 1, which includes approximately 600 tracks, is divided into 5 concentric regions A0-A4 beginning from the outer tracks as shown in FIG. 1. Each region A0-A4 is associated with each write signal compensation: the tracks in the region A0 are not compensated; and the tracks in the regions A1-A4 are compensated by respective compensation amounts which are different from each other. The number of tracks in the respective regions A0-A4 are, for example, 380 tracks in the region A0, 70 tracks in the region A1, 60 tracks in the region A2, 50 tracks in the region A3, and 40 tracks in the region A4. Heads 2 are carried by a carriage 3 and the radial position of the heads 2 is set by an actuator 4 having a drive circuit 4a.

All the heads in the disk storage are connected to a read-write circuit 5 to which a head selection command HS is supplied, and the head designated by the selection command HS passes into the read state or the write state according to the read-write command. The read-write circuit 5 produces a read signal of data patterns from the output terminal R. The read signal is then approximately aligned to its signal level by an AGC circuit 6a in a read signal conversion circuit 6. After that, the read signal is converted into a read signal RS of a predetermined modulation scheme, for example, MFM by a demodulation circuit 6b including a peak detection circuit, and is fed to the signal processing circuit in the controller 110. A write signal WS is generated by the signal processing circuit in the controller 110 in the formal data pattern having the same modulation scheme as the read signal RS. The write signal WS is then subjected to a designated amount of waveform compensation performed by a write signal compensation circuit 10 and a compensation amount switching circuit 40 of the present invention. The write signal is subsequently fed to a write input terminal W of the read-write circuit 5, and is written in a track on the disk 1 through the head 2 in the compensated data pattern.

The disk storage 100 usually includes a simple processor 7 as an inside controller, which supplies the drive signal DS to the drive circuit 4a in the actuator 4, the head selection command HS and read-write command RW to the read-write circuit 5. In addition, the processor 7 is connected to the processor in the controller 110 via interface circuit 8 and buses 9a and 9b. The compensation amount selecting means 50 is incorporated into the processor 7 as software in this embodiment.

The write signal compensation circuit 10 of this embodiment includes four compensation circuits 11-14 corresponding to the regions A1-A4 on the disk 1, respectively. Each write signal compensation circuit 11-14 has the same arrangement as that shown in FIG. 2, except the compensation amounts. The write signal compensation circuits 11-14 have 1-4 times of unit compensation amount or the unit time $\Delta T$, respectively. Thus, the original signal WS is compensated by the amount specific to one of the compensation circuits 11-14, and is produced as a compensated write signal WSc.

The compensation amount switching circuit 40 has two switching circuits 41 and 42, and an OR gate 43. The switching circuit 41 selects whether the compensation of the write signal is performed or not, and the switching circuit 42 selects one of the four compensation circuits 11-14 when the write signal compensation is performed. The OR gate 43 is provided for supplying either the original write signal WS or the compensated write signal WSc to the write terminal of the read-write circuit 5. Corresponding to such a configuration of the compensation amount switching circuit 10, the selection signal produced from the compensation amount selecting means 50 to designate the compensation amount is composed of two selection signals S0 and S1: the 1-bit selection signal S0 designating whether the compensation amount is zero or not, or the necessity of the compensation, to the switching circuit 41; the 2-bit selection signal S1 designating one of the four compensation amounts to the switching circuit 42.

Incidentally, although the switching circuits 41 and 42 are depicted in the form of switches for simplicity, they are practically configured by combinations of logical gates or by multiplexers. In addition, the switching circuit 42 can be provided at the input side of the write signal compensation circuit 10 instead at the output side thereof as can be seen from the figure.

When data are written to the disk in the embodiment, a logical address of the data in the disk 1 is fed from an external host computer (not shown) to the controller 110 through an external bus 111. The processor in the controller 110 transforms the logical address into a physical address, and provides the processor 7 in the disk storage with the disk surface number to which the data are to be written, that is, the head number and the write command. The processor 7, in response to this, provides the read-write circuit 5 with a read write command RW together with a head selection command HS which is equal to the head number, and have the designated head passed into the write state. After that, the processor in the controller 110 provides the processor 7 with a head operation command ST in the form, for example, of step pulses. Thus, the head 2 is positioned on the track whose number corresponds to the physical address.

Meantime, the compensation amount selecting means 50 in the processor 7 selects the compensation amount according to the position of the head 2, the position being one of the regions A0-A4, and supplies the selection signal S0 and S1 to the switching circuits 41 and 42 in the compensation amount switching circuit 40, respectively.

Thus, one of the write signal compensation circuits 11-14 or the original write signal WS is selected by the compensation amount switching circuit 40 so that the write signal is compensated with the designated compensation amount including zero compensation. In this condition, the data to be written into the disk 1 are transferred from the external computer to the controller 110. The signal processing circuit in the controller 110 supplies the write signal WS having waveforms of ordinary (uncompensated) data patterns corresponding to the data to be written to the disk storage 100. The compensation amount switching circuit 40, in response to the designation by the compensation amount selecting means 50, supplies the original write signal WS or the compensated write signal WSc to the read-write circuit 5 via the OR gate 43, and has it written to the disk 1: the compensated write signal WSc is formed by compensating the original write signal by the designated amount by the write signal compensation circuits 11-14.

Next, the embodiment of the write signal compensation circuit will be described with reference to FIGS. 2, 3A and 3B. FIG. 2 is a circuit diagram of the embodiment, and FIGS. 3A and 3B are waveform charts illustrating by comparison the waveforms of write signal WS and compensated write signal WSc.

The write signal compensation circuit in FIG. 2 receives the write signal WS of the original waveform from the left top of the figure, and produces the compensated write signal WSc from the bottom right of the figure. This embodiment shows a configuration for compensating a 4-bit write signal, and can sequentially compensate the waveforms of the write signal successively transferred. As mentioned above, the write signal compensation circuits 11-14 execute the compensation the compensation amounts of which are multiples of a unit compensation amount $\Delta T$. It is assumed that FIG. 2 shows the write signal compensation circuit 14 which performs the compensation of 10 ns, four times the unit compensation amount $\Delta T = 2.5$ ns.

FIG. 3A illustrates an example of the write signal WS of the original wave form: a data pattern of 4-bit data "0110" modulated by the MFM. The write data WS includes two types of periods: $T1 = 100$ ns and $T2 = 200$ ns. In contrast, FIG. 3B illustrates the compensated write signal WSc of the above pattern. The signal WSc includes three types of periods: T3=70 ns, T4=110 ns, and T5=240 ns. In this case, for example, T5+T3=310 ns is longer than T2+T1 in FIG. 3A by 10 ns which corresponds to the compensation amount.

The write signal compensation circuit in FIG. 2 includes four one-shot (monostable multivibrator) circuits 21, 22, 24, and 27 which generate pulses the widths of which are $\tau 1=50$ ns, $\tau 2=220$ ns, $\tau 4=150$ ns, and $\tau 7=70$ ns, respectively, when the one shot circuits are triggered via the connected OR gates or the like. The compensation circuit also includes five delay circuits 23, 25, 26, 28 and 29 the delay time of which are set at $\rho 3=50$ ns, $\rho 5=200$ ns, $\rho 6=240$ ns, $\rho 8=10$ ns, and $\rho 9=20$ ns, respectively. The output of the one-shot circuit 21 triggers the one-shot circuits 22 and 24, and the output of the delay circuit 26 triggers the one-shot circuit 27. The one-shot circuit 24 is cleared by the output of the one-shot circuit 22 applied via the delay circuit 23.

Four NOR gates 31-34 receive two signals out of the following four signals: the output of the one-shot circuit 24, the inverted signal thereof, the output of the delay circuit 25 for delaying the inverted output of the one-shot circuit 24, and the inverted signal thereof. Thus, the four rising and falling edges (a pair of rising and falling edges for the pulse T1 and a pair of rising and falling edges for the pulse T2) of the write data WS in FIG. 3A, which indicates the transitions from "1" to "0" or vice versa, can be separately shifted along the time axis by required amounts.

The four outputs of the NOR gates 31-34 are shaped to signals having pulse width of T3 by NAND gates 35-38 by using the output of the one-shot circuit 27 and the outputs of delay circuits 28 and 29 through which the output of the one-shot circuit 27 passes. The four outputs of the NAND gates 35-38 are ANDed by a NOR gate 39 and an inverter following the NOR gate 39. Thus, the compensated write signal WSc shown in FIG. 3B is produced. In the above description, the data to be written is assumed to be "0110" for the convenience of explanation. However, the circuit in FIG. 2 can be applied to any 4-bit data, and can convert the original write data WS into the compensated write signal WSc by the same compensation amount.

Although a specific embodiment of a write-data signal compensation apparatus for disk storage constructed in accordance with the present invention has been disclosed, it is not intended that the invention be restricted to either the specific configurations or the uses disclosed herein. Modifications may be made in a manner obvious to those skilled in the art. For example, although in the above embodiment, the compensation amount selection means is incorporated into the processor in the disk storage as software, it can be incorporated into the processor in the controller as in conventional systems. In this case, when the controller is incorporated into the disk storage, the processors in the controller and the disk storage can be integrated into one processor.

Accordingly, it is intended that the invention be limited only by the scope of the appended claims.

What is claimed is:

1. A write-data signal compensation apparatus for disk storage for modifying a first write signal having a particular modulation data pattern into a second write signal having a data pattern expedient to be read out from a disk before the second write signal is written to the disk by a write head, said write-data signal compensation apparatus comprising:

write signal compensation means for converting said first write signal into said second write signal by using a plurality of different compensation amounts, said write signal compensation means including a plurality of write compensation circuits, each of said write compensation circuits having an input to which said first write signal is applied and an output from which said second write signal is produced, each of said write compensation circuits changing transition points of pulses of said first write signal so as to compensate pulse widths of the pulses of said first write signal by predetermined amounts to obtain said second write signal, pulse rates of the pulses of said first write signal and said second write signal being maintained at the same rate;

compensation amount selecting means for selecting one of said plurality of different compensation amounts according to the radial position of said write head on said disk; and compensation amount switching means for switching inputs and/or outputs of said write signal compensation means in response to the output of said compensation amount selecting means.

2. A write-data signal compensation apparatus for disk storage as claimed in claim 1, wherein said compensation amount selecting means is provided in a controller of said disk storage.

3. A write-data signal compensation apparatus for disk storage as claimed in claim 1, wherein said compensation amount selecting means designates a compensation amount of zero for the outmost tracks on the disk.

4. A write-data signal compensation apparatus for disk storage as claimed in claim 1, wherein each of said write compensation circuits comprises a plurality of one-shot circuits one of which is triggered by said first write signal, and the others of which are triggered sequentially by outputs of said one-shot circuits;

at least one delay circuit connected to one or more outputs of said one-shot circuits, respectively; and a logic circuit synthesizing outputs of said one-shot circuits and said delay circuits to produce said second write signal.

5. A write-data signal compensation apparatus for disk storage as claimed in claim 1, wherein said compensation amount selecting means is provided in said disk storage.

6. A write-data signal compensation apparatus for disk storage as claimed in claim 5, wherein said compensation amount selecting means is provided in a processor in said disk storage as software.

7. A disk storage for operating in combination with a controller, said disc storage comprising a disc having a plurality of tracks thereon, at least some of said tracks being compensated;

at least one read-write head, said head being movable radially with respect to said disc;

a read-write circuit connected to said read-write head, said read-write circuit generating at a read terminal a read signal of data patterns for coupling to said controller, said controller generating a first write signal in response to said read signal;

write signal compensation means including a plurality of write signal compensation circuits, each of said write signal compensation circuits providing a different compensation amount, for converting said first write signal into a second write signal, each of said write compensation circuits having an input to which said first write signal is applied and an output from which said second write signal is produced, each of said write compensation circuits changing transition points of pulses of said first write signal so as to compensate pulse widths of the pulses of said first write signal by predetermined amounts to obtain said second write signal, pulse rates of the pulses of said first write signal and said second write signal being maintained at the same rate;

compensation amount switching means coupled to said write signal compensation means for switching a selected write signal compensation circuit to a write terminal of said read-write circuit, said read-write circuit thereby receiving said second write signal; and compensation amount selecting means coupled to said compensation amount switching means for generating a signal selecting one of said plurality of write signal compensation circuits in accordance with the radial position of said read-write head on said disk.

8. A disc storage as claimed in claim 7 which further comprises a read signal conversion circuit interposed between the read terminal of said read-write circuit and said controller, said read signal conversion circuit converting said read signal to a predetermined modulation scheme, said controller generating said first write signal in a formal data pattern having the same modulation scheme as said converted read signal.

9. A disc storage as claimed in claim 7, wherein said compensation amount switching means, in addition to switching said write signal compensation circuits, selectively couples said first write signal directly to the write terminal of said read-write circuit in response to a signal from said compensation amount selecting means.

10. A write-data signal compensation apparatus for disk storage as claimed in claim 7, wherein each of said write compensation circuits comprises:

a plurality of one-shot circuits one of which is triggered by said first write signal, and the others of which are triggered sequentially by outputs of said one-shot circuits;

at least one delay circuit connected to one or more outputs of said one-shot circuits, respectively; and a logic circuit synthesizing outputs of said one-shot circuits and said delay circuits to produce said second write signal.

* * * * *